Patented Mar. 17, 1942

2,276,548

UNITED STATES PATENT OFFICE 2,276,548

PRODUCTION OF PHOTOGRAPHIC MULTI-COLOR PICTURES

Wilhelm Schneider, Dessau, Germany, assignor, by mesne assignments, to General Aniline & Film Corporation, New York, N. Y., a corporation of Delaware No Drawing. Application February 3, 1939, Serial No. 254,409. In Germany February 17, 1938

3 Claims. (Cl. 95—2)

My present invention relates to the production of photographic multi-color pictures.

In multi-color photographic material in which multi-color pictures are to be produced by color development, filter layers are frequently used as intermediate layers in the material. Since these filter layers must not retain their color in the finished picture, there have been used as filter dyestuffs primarily those which can be decolorized or removed in the usual photographic baths. Hitherto, however, only few dyestuffs have been known which, in addition to being capable of decolorization in the photographic baths, fulfill all the other requirements for photographic purposes, for example indifference to and non-diffusion into the adjacent photographic emulsions. This small choice of dyestuffs in many cases necessitates a sacrifice of the sensitivity of the photographic emulsion layers by diffusion of the filter dyestuff therein or it is necessary in making the photographic material to introduce separate insulation layers between the filter layers and the photographic layers, whereby the manufacture is complicated.

It is one object of my invention to provide a process of avoiding or minimizing these difficulties by using a multi-layer material the filter layers of which contain substantive azo-dyestuffs, and, after development of the dyestuff image, treating the material for destroying the azo-dyestuff with a reducing agent and then treating it with an oxidizing agent.

A further object of my invention is to provide a multi-layer material the filter layers of which contain azo-dyestuffs which both in acid and in alkaline treating baths do not diffuse and yield on reduction sufficiently soluble decomposition products.

Yet another object of the invention is the provision of a multi-layer material with filter layers which contain azo-dyestuffs having substantive groups, for instance benzidine, primuline, dehydrothiotoluidine, benzoxazole, stilbene, azoxybenzene, para-phenylenediamine, naphthol AS and derivatives thereof. Specific dyestuffs of this kind are, for example Sambesi Brown G (Schultz Farbstofftabellen, vol. I, 7th edition, No. 389), Bonzopurpurine 4 B (Schultz Farbstofftabellen, vol. I, 7th edition, No. 448), Benzoviolet R (Schultz Farbstofftabellen, vol. I, 7th edition, No. 371), Bordeau COV (Schultz Farbstofftabellen, vol. I, 7th edition, No. 374), Congo Extra (Schultz Farbstofftabellen, vol. I, 7th edition, No. 360), also dyestuffs obtainable from benzidine and α-hydroxynaphthoic acid. The dyestuffs may be incorporated in a filter layer which is arranged as the uppermost layer or between two photographic layers, or in an anti-halation layer.

The use of substantive azo-dyestuffs as filter dyestuffs has the advantage that a very large class of dyestuffs of various color value is at the disposal of the manufacturer.

Other objects and advantages of my invention will appear from the following disclosure.

Light-sensitive layers suitable for multi-layer material produced by this invention are particularly such as contain dyestuff components fast to diffusion and may be treated by the process of color development. Examples of such dyestuff components may be found in U. S. Patents 2,154,918, 2,156,821, 2,169,320, 2,178,612, 2,179,238, 2,179,244, 2,186,719, 2,186,732, 2,186,733, 2,186,734, 2,186,735, 2,186,736, 2,186,849, 2,186,851 and 2,200,306. The dyestuffs obtained from these components for producing the color image which belong to the class of azo-methine or quinon-imine dyestuffs, have the property of being decolorized by reducing agents. They cannot, however, be removed from the photographic layer by washing, so that it is possible by a subsequent oxidation to reproduce the color image at the places at which it originally stood.

After the exposure the image is produced in the multi-color material in known manner by color development and the silver obtained by the development is removed. The color image which contains besides the image dyestuff that of the filter, is treated with a reducing agent capable of bleaching the azo-dyestuff present as the filter dyestuff. A suitable reducing agent is, for example, sodium hydrosulfite. In this bleaching operation the dyestuff forming the image, since it belongs to the above named class of azo-methine or quinone-imine dyestuffs is simultaneously reduced. After a short intermediate washing the film is treated with an oxidizing agent, for example, with an aqueous solution of sodium persulfate, potassium ferricyanide or ferric chloride. While the azo-dyestuff by the reduction and subsequent washing has been completely removed from the layer, the reduction product of the dyestuff forming the image remains and after the oxidation is regenerated into the dyestuff.

The following examples illustrate the invention:

*Example 1*

On a photographic support is cast a layer of silver halide emulsion containing per kilo 5 grams of 1-abietoylamino-5-naphthol and a sensitizer for the red region of the spectrum. On this layer is cast a second silver halide emulsion containing per kilo 10 grams of sodium salt of 1-(3'-sulfophenyl)-3-(4''-stearylaminophenyl)-5-pyrazolone and a sensitizer for the green region of the spectrum. On this second layer is cast directly a filter layer which contains a dyestuff made from diazotized benzidine and α-hydroxynaphthoic acid. On this filter layer is cast a layer of silver halide emulsion containing per kilo 5 grams of benzoylacetobenzidide. After exposure this material is developed as usual in a color developer, fixed and treated to remove the silver. For decomposing the yellow filter dyestuff the material now containing the complementary dye image is bathed for 10 minutes in an aqueous solution of 5 per cent strength of sodium hydrosulfite. After an intermediate washing for 10 minutes the material is then treated with a solution containing per liter 50 grams of sodium persulfate and 10 cc. of concentrated ammonia solution. Finally, the picture is washed as usual.

*Example 2*

The material described in Example 1 is exposed and subjected to reversal development so that a correctly colored image is obtained. After removal of the silver the picture is treated as in the previous example.

The process for removing azo-dyestuffs from color pictures which are made by the process of color development may quite generally be used after the dyestuff picture has been produced in the layer, for example it is also possible in the production of negative pictures first to develop with a black-and-white developer and, after fixing the residual silver halide and bleaching the silver image, to perform the color development and, after removal of the silver image, to finish the treatment by the process of this invention. This process of double development is obviously also useful in making reversal pictures.

I claim:

1. In a process of producing a photographic multicolor picture the improvement which comprises exposing a photographic material having several silver halide emulsion layers containing dyestuff components fast to diffusion and being differently color-sensitive and at least one filter layer containing a substantive azo-dyestuff, the reduction products of which are capable of being washed out of the photograhic material, developing said material to provide a dye picture, the reduction products of which are incapable of being washed out of the photographic material, treating said material with an agent which reduces said azo dyestuff to products removable by washing and which reduces said picture dye to products not removable by washing, removing the decomposition products of said azo-dyestuff thus obtained by washing, and treating said material with an oxidizing agent, thereby reforming the color image formed from the said dyestuff components.

2. In a process of producing a photographic multicolor picture the improvement which comprises exposing a photograhic material having several silver halide emulsion layers containing dyestuff components fast to diffusion and being differently color-sensitive and at least one filter layer containing a substantive azo-dyestuff, the reduction products of which are capable of being washed out of the phtographic material, developing said material to provide a dye picture, the reduction products of which are incapable of being washed out of the photographic material, treating said material with an aqueous solution of sodium hydrosulfite which reduces said azo-dyestuff to products removable by washing and which reduces said picture dye to products not removable by washing, removing the decomposition products of said azo-dyestuff thus obtained by washing, and treating said material with an oxidizing agent thereby reforming the color image formed from the said dyestuff components.

3. In a process of producing a photographic multicolor picture the improvement which comprises exposing a photographic material having several silver halide emulsion layers containing dyestuff components fast to diffusion and being differently color-sensitive and at least one filter layer containing a substantive azo-dyestuff, the reduction products of which are capable of being washed out of the photographic material, developing said material to provide a dye picture, the reduction products of which are incapable of being washed out of the photographic material, treating said material with an aqueous solution of sodium hydrosulfite which reduces said azo-dyestuff to products removable by washing and which reduces said picture dye to products not removable by washing, removing the decomposition products of said azo-dyestuff thus obtained by washing, and treating said material with an aqueous solution containing sodium persulfate and ammonia, thereby reforming the color image formed from the said dyestuff components.

WILHELM SCHNEIDER.